(12) United States Patent
Souter et al.

(10) Patent No.: US 6,827,874 B2
(45) Date of Patent: Dec. 7, 2004

(54) WATER TREATMENT COMPOSITIONS

(75) Inventors: Philip Frank Souter, Morpeth (GB); Colin Ure, Wallsend (GB)

(73) Assignee: The Procter & Gamble Co., Cincinnati, OH (US)

( * ) Notice: Subject to any disclaimer, the term of this patent is extended or adjusted under 35 U.S.C. 154(b) by 0 days.

(21) Appl. No.: 10/324,358

(22) Filed: Dec. 20, 2002

(65) Prior Publication Data

US 2004/0026657 A1 Feb. 12, 2004

Related U.S. Application Data

(63) Continuation of application No. PCT/US01/19879, filed on Jun. 21, 2001, now abandoned.

(30) Foreign Application Priority Data

| Jun. 27, 2000 | (GB) | 0015569 |
| Jun. 27, 2000 | (GB) | 0015571 |
| Nov. 8, 2000 | (GB) | 0027214 |

(51) Int. Cl.⁷ .................. C02F 5/10; A01N 25/10
(52) U.S. Cl. .............. 252/181; 252/179; 210/721; 210/728; 424/407
(58) Field of Search .............. 252/179, 181; 424/407; 210/721, 728; 524/47, 56, 423

(56) References Cited

U.S. PATENT DOCUMENTS

| 3,082,173 A | * | 3/1963 | Horvitz | 252/181 |
| 3,350,304 A | * | 10/1967 | Bacon | 252/181 X |
| 3,923,665 A | | 12/1975 | Lambert et al. | 210/501 |
| 4,076,622 A | | 2/1978 | Costin | 210/64 |
| 4,133,754 A | | 1/1979 | Bory et al. | 210/36 |
| 4,187,183 A | | 2/1980 | Hatch | 210/501 |
| 4,190,529 A | | 2/1980 | Hatch | 210/29 |
| 4,196,081 A | | 4/1980 | Pavia | 210/94 |
| 4,238,477 A | | 12/1980 | Lambert et al. | |
| 4,389,311 A | | 6/1983 | La Freniere | 210/198.1 |
| 4,420,590 A | | 12/1983 | Gartner | 525/357 |
| 4,666,600 A | | 5/1987 | Hankammer | 210/266 |
| 4,759,844 A | | 7/1988 | Lipschultz et al. | 210/257.2 |
| 4,999,190 A | | 3/1991 | Fina et al. | 424/79 |
| 5,023,012 A | | 6/1991 | Buchan et al. | 252/181 |
| 5,071,587 A | | 12/1991 | Perman | 252/181 |
| 5,112,500 A | * | 5/1992 | Jones | 210/728 |
| D331,446 S | | 12/1992 | Gidman | D23/209 |
| 5,277,931 A | | 1/1994 | Maglio et al. | 427/212 |
| 5,308,482 A | | 5/1994 | Mead | 210/207 |
| 5,320,773 A | | 6/1994 | Perman et al. | 252/181 |
| 5,393,435 A | | 2/1995 | Deans et al. | 210/714 |
| 5,543,056 A | | 8/1996 | Murcott et al. | 210/705 |
| 5,624,567 A | | 4/1997 | Colombo | 210/652 |
| 5,632,904 A | | 5/1997 | Samad et al. | 210/764 |
| 5,681,475 A | | 10/1997 | Lamensdorf et al. | 210/666 |
| 5,698,210 A | * | 12/1997 | Levy | 424/407 X |
| 5,718,827 A | | 2/1998 | Rydell et al. | 210/505 |
| 5,785,864 A | | 7/1998 | Teran et al. | 210/739 |
| 5,868,933 A | | 2/1999 | Patrick et al. | 210/484 |
| 5,876,489 A | | 3/1999 | Kunisaki et al. | 96/226 |
| 6,602,410 B1 | * | 8/2003 | Tanner et al. | 210/728 |

FOREIGN PATENT DOCUMENTS

| CA | 1 186 967 | 5/1982 |
| EP | 0 066 421 | 1/1987 |
| EP | 0 402 406 | 12/1992 |
| EP | 0 402 865 | 12/1993 |
| EP | 0 532 639 | 7/1995 |
| WO | WO 91/18838 | 12/1991 |
| WO | WO 93/18837 | 9/1993 |
| WO | WO 95/33690 | 12/1995 |
| WO | WO 96/32194 | 10/1996 |
| WO | WO 97/06109 | 2/1997 |
| WO | WO 98/05594 | 2/1998 |
| WO | WO 00/00437 | 1/2000 |
| WO | WO 00/27759 | 5/2000 |

OTHER PUBLICATIONS

E.M. Powers, et al., "Biocidal Efficacy of a Flocculating Emergency Water Purification Tablet", *Applied and Environmental Microbiology,* Jul. 1994, pp. 2316–2323, vol. 60, No. 7.

* cited by examiner

*Primary Examiner*—Daniel S. Metzmaier
(74) *Attorney, Agent, or Firm*—S. Robert Chvey; Richard Alexander

(57) ABSTRACT

Compositions, methods and kits for purifying, clarifying nutrifying and any combination thereof, contaminated drinking water, which contain a primary coagulant material and a bridging flocculent material. The levels and ratios of coagulant to flocculent preferably fall within certain ranges. Highly preferred compositions also contain one or more of a cationic coagulant aid, especially chitosan, a microbiocidal disinfectant, a water-soluble alkali, a water-insoluble silicate, and a food additive or nutrient source.

19 Claims, No Drawings

WATER TREATMENT COMPOSITIONS

CROSS REFERENCE

This Continuation Application is the National Stage of International Application No. PCT/US01/198791 filed Jun. 21, 2001, is now abandoned, and which was published in English, and is hereby incorporated by reference. The PCT International Application Serial No. PCT/US01/19879 claims priority to UK Applications 0015571.3, filed Jun. 27, 2000, 0015569.7, filed Jun. 27, 2000, and 0027214.6, filed Nov. 8, 2000.

FIELD OF THE INVENTION

The present invention relates to compositions, methods and kits for use in the purification of contaminated drinking water for purposes of rendering it potable. The compositions and kits are especially designed for personal or domestic use in the batchwise purification and clarification of relatively small predetermined volumes of contaminated drinking water. The compositions and kits are also designed for personal or domestic use in the purification and nutrification of contaminated drinking water.

BACKGROUND TO THE INVENTION

There is a need for potable water in all areas of the world. In developed countries, water is purified and potable water is supplied on a large scale, typically by large national or multinational water management companies. This water is typically supplied directly to the consumers homes in a potable form. However, in some parts of the world, for example in some rural areas of developing countries, many people either do not have a direct water supply to their homes and only have access to a non-potable communal water supply such as a village well, or cannot be guaranteed that the water they do receive is potable. As a result, considerable numbers of people die each year as the direct result of drinking contaminated drinking water. Thus, there is a need for water purification kits and compositions that allow the consumer to purify their own water, which produces potable water in a fast and efficient manner.

Current water purification compositions available on the market to date, consist mainly of disinfectants, e.g. sources of chlorine and/or iodine, and do not adequately purify water. Water which is obtained after treatment by these water purification kits, may still comprise amounts of water impurities, e.g. heavy metal ions such as arsenic, which, when continually consumed for a prolonged period of time, may lead to health problems. Thus, there is a need to provide a water purification composition which removes water-impurities like heavy metal ions including arsenic and lead, more efficiently and effectively than current water purification kits.

It has now been found that water purification compositions based on certain combinations of inorganic coagulants and water-soluble or water-dispersible polymers remove greater amounts of water impurities, such as heavy metals, from water compared to current water purification compositions.

Also, current water purification compositions do not adequately remove, kill or inactive micro-organisms such as bacteria, viruses and cysts, which are present in the water. Thus, there remains a need to provide a water purification composition which does adequately remove, kill or inactive these micro-organisms.

It has now been found that when the composition of the present invention comprises a disinfecting agent, the composition removes, kills or inactivates a surprisingly larger amount of micro-organisms such as bacteria, viruses and cysts compared to water purification compositions known in the art.

In addition, the water which is to be purified by a water purification composition typically comprises a large amount of water-soluble organic content such as humic acid. With current water purification compositions, bleach, especially chlorine based bleach, can react with the water-soluble organic content and produce by-products in the water, including chlorine derivatives such as chloroacetic acid or chloroform, which are harmful to human and animal health. Thus, there is a need to provide water purification compositions, methods and kits which produce purified water comprising a low amount of disinfection by-products.

Another problem associated with the use of certain chlorine-based disinfectants such as calcium hypochlorite is that of product stability. In particular, it has been found that known compositions based on calcium hypochlorite can lose substantial disinfection efficacy under regular conditions of storage and use. Thus, there is a need for purification and disinfection compositions having improved storage stability.

After purification and disinfection of contaminated drinking water, there raises the further problem of maintaining the purity of the water until such time as it is required for drinking, whilst at the same time providing drinking water of satisfactory taste. Thus there is a need for compositions, methods and kits for purifying contaminated drinking water and which provides purified water having both longer life and improved taste attributes.

In addition to the need for purifying and clarifying contaminated drinking water, there is also a huge need in many parts of the world to improve standards of nutrition and health. The effective provision of both clean water and essential minerals and vitamins would clearly be of universal benefit but especially so in those parts of the world where potable water is in short supply. Thus there is a need for compositions, methods and kits for purifying and at the same time nutrifying contaminated drinking water.

SUMMARY OF THE INVENTION

The present invention relates to compositions, methods and kits for purifying and/or clarifying contaminated drinking water, as well as to compositions, methods and kits for purifying and nutrifying contaminated drinking water. In general terms, the compositions herein comprise at least a primary coagulant material and a so-called bridging flocculent material, the levels and ratios of coagulant to flocculent preferably falling within certain ranges. Highly preferred compositions also contain one or more of a coagulant aid, a microbiocidal disinfectant, a water-soluble alkali, a water-insoluble silicate (for example a clay, zeolite or mixture thereof), and a food additive or nutrient source.

According to a first aspect of the invention, there is provided a composition for purifying and clarifying contaminated drinking water and which comprises a primary coagulant, a bridging flocculent and a coagulant aid.

In preferred embodiments, the primary coagulant is selected from the group consisting of water-soluble, multivalent inorganic salts and mixtures thereof, for example, iron sulphate, iron chloride, aluminium chloride, aluminium sulphate, manganese sulphate, manganese chloride, copper sulphate, copper chloride, poly- variations thereof, and mixtures thereof. Generally, the compositions herein comprise from about 10% to about 99%, preferably from about 15% to about 50%, more preferably from about 25% to about 40% by weight of the primary coagulant.

The bridging flocculent on the other hand is preferably a high molecular weight water-soluble or water-dispersible polymer or mixture of polymers having a weight average molecular weight of at least about 2,000,000, more preferably at least about 5,000,000 and especially at least about 15,000,000. Bridging flocculents preferred for use herein are selected from the group consisting of water-soluble and water-dispersible anionic and nonionic polymers and mixtures thereof. Generally, the compositions herein comprise from about 0.1% to about 10%, preferably from about 0.2% to about 5%, more preferably from about 0.5% to about 3% by weight of the bridging flocculent The term 'coagulant aid' herein refers to a water-soluble or water-dispersible polymer of lower molecular weight than that of the bridging flocculent and which aids the overall aggregation and flocculation process. The coagulant aid preferred for use herein is a low molecular weight, water-soluble or water-dispersible polymer which generally has a weight average molecular weight of less than about 1,500,000, preferably less than about 750,000 and especially less than about 300,000 and mixtures thereof. Generally the compositions herein comprise from about 0.1% to about 10%, preferably from about 0.5% to about 5%, more preferably from about 1% to about 4% by weight of the coagulant aid.

Although suitable coagulant aids include anionic polymeric hydrophilic colloids such as the carboxymethylcelluloses, highly preferred from the viewpoint of delivering excellent heavy metal, total soluble organic and cyst reduction performance are coagulant aids selected from the group consisting of water-soluble and water-dispersible cationic polymers and mixtures thereof, for example cationic polysaccharides of which chitosan is especially preferred. Preferred coagulant aids herein are substantially water-insoluble, having at least 10% by dry total weight of undissolved material as determined by the test described herein below, this being preferred from the viewpoint of providing compositions and methods delivering low total water-soluble organic content.

The weight ratio of primary coagulant to bridging flocculant herein is preferably from about 10:1 to about 200:1, more preferably from about 10:1 to about 150:1, yet more preferably from about 20:1 to about 100:1, and especially from about 25:1 to about 75:1, these ratios being valuable especially in conjunction with the levels of coagulant and flocculant described herein above for providing optimum purification performance in highly contaminated water conditions and for providing significantly improved rates of filtration and 'non-blocking' filter characteristics as well as excellent final product purity and clarity using paper and non-woven filters. Although the reasons for this improvement in filtration rate, non-blocking characteristics and product clarity are not fully understood, it is believed that higher levels and ratios of the bridging flocculant relative to the coagulant increases the 'stickiness' of the flocs with a consequent reduction in colloidal particulates. Such compositions are also highly suitable for use herein in conjunction with cloth filters.

Thus, according to another aspect of the invention, there is provided a composition for purifying and clarifying contaminated drinking water and which comprises a primary coagulant selected from the group consisting of water-soluble, multivalent inorganic salts and mixtures thereof; a water-soluble or water-dispersible polymeric bridging flocculent wherein the weight ratio of primary coagulant to bridging flocculant is from about 10:1 to about 150:1, preferably from about 20:1 to about 100:1, and more preferably from about 25:1 to about 75:1; and optionally a water-soluble or water-dispersible polymeric coagulant aid. The filtration characteristics of the composition can be assessed using a standard filtration test and are preferably such that at least one litre of treated model surface water after treatment with 620 mg/litre of purification composition passes a Whatman 1.21 $\mu$m GF/C grade filter in less than 1 hour, preferably less than 45 minutes, and more preferably less than 30 minutes under ambient temperature conditions (20° C.) and that at least 1 litre, preferably at least 2 litres, more preferably at least 3 litres of the treated water will pass the filter without blocking.

The model surface water described comprises:
(i) 24 mg/l humic acid—source of soluble natural organic matter;
(ii) 20 mg/l fine test dust(1–3 $\mu$m)—designed to add turbidity;
(iii) 1500 mg/l salt—to give stress conditions of high total dissolved solids.

The resultant water has a high organic content (>10 mg/l total organic content (TOC)), high colour (>300 platinum cobalt units (PCU)), high turbidity (>15 nephelometric turbidity units (NTU)) and high total dissolved solids (TDS). The pH of the water is near neutral but can also be adjusted to pH 5 or 9 using HCl or NaOH respectively for stress testing. This water is referred to herein as 'model surface water'.

Compositions having optimum purification and clarification performance can also be defined by reference to the weight ratio of the primary coagulant and coagulant aid to the bridging flocculant. Thus, in preferred embodiments, the weight ratio of primary coagulant to coagulant aid is from about 8:1 to about 100:1, preferably from about 12:1 to about 30:1, and more preferably from about 15:1 to about 25:1. The weight ratio of coagulant aid to bridging flocculant, on the other hand, is preferably in the range from about 10:1 to about 1:6, preferably from about 5:1 to about 1:3, more preferably from about 3:1 to about 1:1.

The compositions, methods and kits of the invention also preferably comprise a microbiocidal disinfectant. Although a broad range of microbiocidal disinfectants are envisaged for use herein, preferred is a chlorine-based disinfectant. Calcium hypochlorite is especially preferred. Preferably, the compositions herein comprise primary coagulant and microbiocidal disinfectant in a weight ratio of from about 10:1 to about 100:1, more preferably from about 12:1 to about 60:1, and especially from about 15:1 to about 40:1. Generally, the compositions herein comprise from about 0.2% to about 10%, preferably from about 0.5% to about 4%, more preferably from about 0.7% to about 2.5% by weight of the microbiocidal disinfectant.

The compositions, methods and kits of the invention will also generally comprise a water-soluble alkali, this being valuable from the viewpoint of delivering an optimum in-use pH profile. In general terms, the levels of primary coagulant and alkali should be adjusted so as to provide a pH at in-use concentration (generally about 620 ppm of total composition) in the range from about 6.0 to 8.5, but preferably in the range from about 6.0 to 7.0, this being preferred from the viewpoint of providing performance robustness to contaminated waters of differing contamination levels and types. To achieve the requisite pH levels, the weight ratio of primary coagulant to water-soluble alkali will generally be in the range from about 0.8:1 to about 3:1, preferably from about 0.9:1 to about 2.4:1, and more preferably from about 1:1 to about 2:1. Generally, the compositions comprise from about 10% to about 45%, preferably from about 15% to about 40%, more preferably from about 20% to about 35% by weight of the water-soluble alkali.

The compositions, methods and kits of the invention can also include a water-insoluble silicate material such as a clay or zeolite which acts to aid the flocculation process by acting as a seed particle or by promoting absorption or cation exchange of metal ions. In preferred embodiments, the weight ratio of primary coagulant to water-insoluble silicate herein is from about 0.3:1 to about 5:1, preferably from about 0.7:1 to about 2:1, and more preferably from about 0.8:1 to about 1.2:1. Generally, the compositions herein comprise from about 10% to about 80%, preferably from about 20% to about 50%, more preferably from about 25% to about 35% by weight of the water-insoluble silicate.

The compositions and kits herein can utilized in a variety of forms and process types including batch and continuous, but preferably the composition is in unit dosage form and is used in the batchwise purification and clarification of a relatively small predetermined volume of contaminated drinking water. By relatively small volume is meant a volume of water typically required for immediate consumption in domestic or personal use, or which is required for short term storage and consumption. Typically, the compositions herein will be used for treating a volume of contaminated drinking water in the range from about 0.1 to about 100, preferably from about 0.5 to about 40, more preferably from about 5 to about 20 and especially from about 8 to about 13 litres. Unit dosage amounts of the composition, on the other hand, will generally range from about 50 to about 2000, preferably from about 100 to about 1000, more preferably from about 250 to about 750 mg per litre of contaminated drinking water. Unit dosage forms suitable for use herein include tablets, compacts, extrudates, water-soluble single and multi-compartment pouches etc but preferred unit dosage forms are single and multi-compartment sachets comprising a unit dose of granular or powdered composition which is opened prior to use and the contents emptied into a predetermined quantity of contaminated drinking water.

For the above purposes, highly preferred herein is a composition in unit dosage form comprising;
(i) from about 15% to about 50%, preferably from about 25% to about 40% by weight of the primary coagulant;
(ii) from about 0.2% to about 5%, more preferably from about 0.5% to about 3% by weight of the bridging flocculent; and
(iii) from about 0.5% to about 5%, more preferably from about 1% to about 4% by weight of the coagulant aid.

It is also important to ensure that in-use of the compositions, effective levels of the formulation ingredients are delivered to the sample of contaminated water to be purified. Thus the levels of primary coagulant, bridging flocculant and coagulant aid in composition should preferably be sufficient to provide by weight of the contaminated drinking water from about 50 to about 500, preferably from about 75 to about 300, more preferably from about 100 to about 250 ppm of primary coagulant, from about 1 to about 15, preferably from about 2 to about 10, more preferably from about 2.5 to about 7.5 ppm of bridging flocculent, and from about 1 to about 25, preferably from about 5 to about 20, more preferably from about 8 to about 12 ppm of coagulant aid.

In preferred embodiments, the microbiocidal disinfectant is incorporated in the compositions of the invention in a controlled, delayed, sustained or slow release form whereby the disinfectant is released into the drinking water and allowed to react with soluble organic impurities therein only after substantial completion of the coagulation and flocculation stage, this being valuable from the viewpoint of controlling and minimising the level of trihalomethanes (THM) generated during the purification process. A measure of the rate of release of disinfectant herein is $t_{max}$, this being the time taken to achieve maximum residual disinfectant concentration after addition of the composition to deionized water at 20° C. with gentle stirring. Preferably the compositions herein have a $t_{max}$, of at least about 1 minute, preferably at least about 2 minutes, more preferably at least about 4 minutes, and especially at least about 8 minutes. The rate of coagulation and flocculation of organic impurities, on the other hand, is measured by the n %-ile soluble organic matter flocculation rate ($t_n$). The n%-ile soluble organic matter flocculation rate is defined herein as the time taken for n % reduction in the concentration of humic acid as measured according to the procedure described hereinbelow. Preferably, $t_{80}$ for the compositions herein is less than about 2 minutes, preferably less than about 1 minute, more preferably less than about 30 seconds. In preferred embodiments, moreover, $t_{90}$ for the compositions herein is less than about 2 minutes, preferably less than about 1 minute, more preferably less than about 30 seconds.

Thus according to another aspect of the invention, there is provided a composition for purifying and clarifying contaminated drinking water and which comprises:
(i) a primary coagulant selected from the group consisting of water-soluble, multivalent inorganic salts and mixtures thereof;
(ii) a water-soluble or water-dispersible polymeric bridging flocculant; and
(iii) a microbiocidal disinfectant; and wherein the microbiocidal disinfectant is in controlled, delayed, sustained or slow release form whereby the composition has a $t_{max}$ corresponding to the time for achieving maximum disinfectant concentration after addition to deionized water at 20° C. which is greater than the 80%-ile soluble organic flocculation rate ($t_{80}$) of the composition and more preferably greater than the 90%-ile soluble organic flocculation rate ($t_{90}$) of the composition.

Preferably $t_{max}$ is at least about 1 minute, more preferably at least about 2 minute, even more preferably at least about 4 minutes and especially at least about 8 minutes greater than $t_{80}$ and preferably greater than $t_{90}$.

The n%-ile organic matter flocculation rate is measured on the model surface water described herein above. 620 mg of the water-purification composition is added to a 1 litre sample of the model surface water with stirring. Aliquots of the liquid are then taken at 30 second intervals, each aliquot being filtered through a 0.45 µm filter. The colour of the aliquot is then measured using for example a Hanna HI93727 colour meter and compared with a set of standards of known humic acid concentration and colour reading. The n%-ile soluble organic matter flocculation rate is the time taken to achieve a colour reading corresponding to a humic acid level which is (100-n) % of that of the initial level (24 ppm).

Preferably the final colour achieved (for example post-filtration at 30 minutes) using the purification compositions of the invention either in-vivo or on model surface water is less than 20 PCU, more preferably less than 15 PCU and especially less than 10 PCU. The final turbidity achieved using the purification compositions of the invention either in-vivo or on model surface water, on the other hand, is preferably less than 5 NTU, more preferably less than 2 NTU and especially less than 1 NTU, turbidity being measured using a Jenway 6035 turbidity meter calibrated daily against a 5.0 NTU standard.

In an alternative embodiment, the disinfectant and water-purification composition can be used in separate treatment steps, either simultaneously or sequentially with one another.

Preferably, the weight ratio of water-purification composition to disinfectant when used separately is from 10000:1, or preferably from 5000:1 or preferably from 1000:1, or preferably from 500:1, and preferably to 2:1, or preferably to 10:1, or preferably to 25:1, or preferably to 50:1, or preferably to 100:1.

The compositions, methods and kits of the invention also preferably comprise a food additive or nutrient source, this being valuable from the viewpoint of providing drinking water which is not only pure but which also contains essential minerals and other food additives necessary for good health and nutrition. The food additive or nutrient source can be included in the kits of the invention as one or more separate compositions in unit dosage form, or they can be incorporated directly into the water-purification composition itself.

Thus, according to a further aspect of the invention, there is provided a composition for purifying, clarifying and nutrifying contaminated drinking water and which comprises:

(i) a primary coagulant selected from the group consisting of water-soluble, multivalent inorganic salts and mixtures thereof;

(ii) a water-soluble or water-dispersible polymeric bridging flocculent; and (iii) a food additive or nutrient source.

In the case of food additives and nutrient sources which are non-coagulable or which at least partially survive the coagulation and flocculation process, for example fluoridating agents, iodinating agents, and essential minerals such as zinc and iron, the food additive or flocculent can be incorporated without special measures into the water purification composition. Otherwise, the food additive or nutrient sources can also be incorporated in controlled, delayed, sustained or slow release form as described herein with respect to the disinfectant. In this instance, the composition should have has a $t_{max}$ corresponding to the time for achieving maximum nutrient concentration after addition to deionized water at 20° C. which is greater than the 80%-ile soluble organic flocculation rate ($t_{80}$) and preferably greater than the 90%-ile soluble organic flocculation rate ($t_{90}$) of the composition.

It is also desirable herein to control the free moisture content of the water-purification compositions, especially in those compositions of the invention comprising calcium hypochlorite as microbiocidal disinfectant. It should be understood that many of the ingredients of the compositions herein such as the bentonite clays, alum based coagulants, etc contain a natural amount of free moisture and this has been found to be especially detrimental to calcium hypochlorite stability. In preferred embodiments, therefore, the compositions of the invention should have a free-moisture content of less than about 6%, preferably less than about 4% and more especially less than about 2.5% by weight thereof. It is also highly desirable to incorporate one or more ingredients which are capable of acting as a moisture sink, for example, low-moisture, pre-dried clays and hydratable salts in anhydrous or partly hydrated form whereby the free moisture content of the composition is maintained below the theoretical amount necessary for 100% hydration of the components of the composition. Particularly preferred moisture sinks include pre-dried clays and aluminosilicates, anhydrous sodium carbonate, and mixtures thereof. Preferably the moisture silks have a free moisture content of less than about 4%, more preferably less than about 3%, especially less than about 2.5% and more especially less than about 1.5% by weight. Free moisture content of the product or moisture sink is determined as follows. A 2 g sample of the product or moisture sink is extracted into 50 mls of dry methanol at room temperature for 20 mins. A 1 ml aliquot of this solution is then taken and the free moisture determined by a standard Karl Fischer titration. The free moisture is expressed as the percentage weight of water relative to the sample weight (in this case 2 g).

Thus according to another aspect of the invention, there is provided a composition for purifying and clarifying contaminated drinking water and which comprises:

(i) a primary coagulant selected from the group consisting of water-soluble, multivalent inorganic salts and mixtures thereof;

(ii) a water-soluble or water-dispersible polymeric bridging flocculent;

(iii) calcium hypochlorite as microbiocidal disinfectant; and optionally (iv) a moisture sink, and wherein the composition has a free-moisture content of less than about 6%, preferably less than about 4% and more especially less than about 2.5% by weight thereof.

The present invention also relates to methods for purifying contaminated drinking water comprising contacting the water with at least a primary coagulant material and a bridging flocculent material wherein the levels and ratios of coagulant to flocculent preferably fall within certain ranges. Highly preferred methods also comprise contacting the drinking water with one or more of a coagulant aid, a microbiocidal disinfectant, a disinfectant neutralization agent; a water-soluble alkali, a water-insoluble silicate (for example a clay, zeolite or mixture thereof), and a food additive or nutrient source.

Thus in a method aspect, the invention relates to a method for purifying and clarifying contaminated drinking water and which comprises contacting the contaminated water with:

(i) a primary coagulant selected from the group consisting of water-soluble, multivalent inorganic salts and mixtures thereof;

(ii) a bridging flocculent selected from the group consisting of water-soluble and water-dispersible anionic and nonionic polymers having a weight average molecular weight of at least about 2,000,000, and mixtures thereof; and (iii) a coagulant aid selected from the group consisting of water-soluble and water-dispersible cationic polymers having a weight average molecular weight of less than about 1,500,000, and mixtures thereof.

In a another method aspect, the invention relates to a method for purifying and clarifying contaminated drinking water and which comprises contacting the contaminated water with:

(i) a primary coagulant selected from the group consisting of water-soluble, multivalent inorganic salts and mixtures thereof;

(ii) a water-soluble or water-dispersible polymeric bridging flocculent preferably selected from the group consisting of water-soluble and water-dispersible anionic and nonionic polymers, the polymeric bridging flocculent having a weight average molecular weight of at least about 2,000,000, and wherein the weight ratio of primary coagulant to bridging flocculant is from about 10:1 to about 150:1, preferably from about 20:1 to about 100:1, and more preferably from about 25:1 to about 75:1; and optionally (iii) a water-soluble or water-dispersible polymeric coagulant aid preferably selected from the group consisting of water-soluble and water-dispersible cationic polymers, the polymeric coagulant aid having a weight average molecular weight of less than about 1,500,000.

The present invention further relates to a method for purifying, clarifying and nutrifying contaminated drinking water and which comprises contacting the contaminated water with:

(i) a primary coagulant selected from the group consisting of water-soluble, multivalent inorganic salts and mixtures thereof;

(ii) a water-soluble or water-dispersible polymeric bridging flocculant; and (iii) a food additive or nutrient source.

The methods of the invention comprise a number of distinct chemical and physical stages which can run either concurrently or in sequence. In broad terms, these stages include (i) a coagulation and flocculation stage in which the contaminated drinking water is brought into mixing contact with the coagulant, bridging flocculant and, if present, the coagulant aid so as to coagulate and flocculate the water impurities in the form of solid matter;

(ii) a disinfectant stage in which the drinking water is brought into microbiocidal contact with the disinfectant during or after substantial completion of the coagulation and flocculation stage;

(iii) a separation stage prior or subsequent to the disinfectant stage in which the solid matter is physically separated from the drinking water.

Preferably, the drinking water is brought into microbiocidal contact with the disinfectant after substantial completion of the coagulation and flocculation stage whereby $t_{max}$ as hereinabove defined is greater than the 80%-ile soluble organic flocculation rate ($t_{80}$) and preferably greater than the 90%-ile soluble organic flocculation rate ($t_{90}$) of the composition.

In addition, the methods of the invention also preferably include a neutralization stage in which the drinking water is brought into contact with a disinfectant neutralization agent subsequent to said separation stage in order in order to maintain drinking water purity during storage of the drinking water but to reduce or remove excess disinfectant prior to use. In the case of chlorine-based disinfectants, suitable disinfectant neutralization agents include activated carbon and reducing agents such as sodium thiosulfate, sodium sulphite, hydrogen peroxide and sodium percarbonate.

Thus, according to a further aspect of the invention, there is provided a method for purifying and clarifying contaminated drinking water and which comprises subjecting the contaminated water to:

(i) a coagulation and flocculation stage in which the contaminated drinking water is brought into mixing contact with a primary coagulant, a polymeric bridging flocculant and, optionally a polymeric coagulant aid so as to coagulate and flocculate the water impurities in the form of solid matter;

(ii) a disinfectant stage in which the drinking water is brought into microbiocidal contact with a disinfectant during or after substantial completion of the coagulation and flocculation stage;

(iii) a separation stage prior or subsequent to the disinfectant stage in which the solid matter is physically separated from the drinking water; and (iv) a neutralization stage in which the drinking water is brought into contact with a disinfectant neutralization agent subsequent to said separation stage in order to reduce or remove excess disinfectant.

In addition, the methods of the invention also preferably include a nutrifying stage in which the drinking water is brought into contact with the food additive or nutrient source prior or subsequent to the separation stage.

Thus in a further method aspect, there is provided a method for purifying, clarifying and nutrifying contaminated drinking water and which comprises subjecting the contaminated water to:

(i) a coagulation and flocculation stage in which the contaminated drinking water is brought into mixing contact with a primary coagulant, a polymeric bridging flocculant and, optionally a polymeric coagulant aid so as to coagulate and flocculate the water impurities in the form of solid matter;

(ii) a disinfectant stage in which the drinking water is brought into microbiocidal contact with a disinfectant during or after substantial completion of the coagulation and flocculation stage;

(iii) a separation stage prior or subsequent to the disinfectant stage in which the solid matter is physically separated from the drinking water; and (iv) a nutrifying stage in which the drinking water is brought into contact with a food additive or nutrient source prior or subsequent to the separation stage.

In the method aspects of the invention, the primary coagulant is generally added in an amount of from about 50 to about 500, preferably from about 75 to about 300, more preferably from about 100 to about 250 ppm by weight of the contaminated drinking water; the bridging flocculant is generally added in an amount of from about 1 to about 15, preferably from about 2 to about 10, more preferably from about 2.5 to about 7.5 ppm by weight of the contaminated drinking water; the coagulant aid is generally added in an amount of from about 1 to about 25, preferably from about 5 to about 20, more preferably from about 8 to about 12 ppm by weight of the contaminated drinking water; and the microbiocidal disinfectant is added in an amount of from about 2 to about 25, preferably from about 3 to about 20, more preferably from about 4 to about 15 ppm by weight of the contaminated drinking water. The volume of contaminated drinking water treated according to the methods of the invention is preferably in the range from about 0.1 to about 100, more preferably from about 0.5 to about 40, yet more preferably from about 5 to about 20, and especially from about 8 to about 13 litres.

Although any convenient method of separating the solid matter from the partially purified drinking water can be utilized, for example, by decanting, sedimentation, flotation, etc, preferably separation is accomplished by filtration in a separation stage using a paper, non-woven or cloth filtration element. Moreover, separation of the solid matter is preferably accomplished in a single filtration step without the need for change of the filtration element. It is a feature of the invention that the compositions and methods have superior filtration characteristics through disposable paper and non-woven filters and such filtration means may be preferred for optimum performance in removing cysts and bacterial contamination. The compositions and methods of the invention also provide superior filtration characteristics through cloth filtration elements made of a hydrophilic substrate such as cotton and such systems may be preferred from the viewpoint of cost and environmental considerations whilst at the same time providing highly effective filtration performance.

The compositions, methods and kits of the invention are particularly valuable in the purification of water which has been contaminated with heavy metals such as arsenic and/or lead and are effective in purifying water to an arsenic concentration below about 5 ppb, preferably below about 2 ppb and to a lead concentration below about 15 ppb, preferably below about 10 ppb.

The compositions, methods and kits of the invention are also valuable in the purification of water which has been contaminated with soluble organic impurities such as humic acid and are effective in purifying water to a total organic content below about 10 ppm, preferably below about 7 ppm and more preferably below about 4 ppm and to a trihalomethane (THM) level below about 100 ppb, preferably below about 70 ppb, more preferably below about 40 ppb.

The compositions, methods and kits of the invention are also valuable in the purification of water which has been contaminated with cysts such as Giardia and *Cryptosporidium parvum* and wherein the cyst concentration is reduced by a factor of at least about log 2, preferably at least about log 3, and more preferably by a factor of at least about log 3.5.

In a kit aspect, the present invention relates to a kit for purifying and clarifying contaminated drinking water and which comprises (i) one or more unit doses of the water-purification composition herein, and (ii) means for physically separating solid matter from drinking water.

The means for physically separating solid matter from drinking water includes cloth, paper and non-woven filters as described hereinabove.

The kits of the invention can additionally comprise one or more unit doses of a microbiocidal disinfectant composition and/or one or more unit doses of a food additive or nutrient composition. The microbiocidal disinfectant composition can be used with the water-purification composition either simultaneously or sequentially. Also the food additive or nutrient composition can be used with the water-purification composition either simultaneously or sequentially.

DETAILED DESCRIPTION OF THE INVENTION

Primary Coagulant

Primary coagulants suitable for use herein include water-soluble inorganic salts and mixtures thereof. In highly preferred embodiments, the composition herein comprises an inorganic metal salt selected from the group consisting of iron sulphate, iron chloride, manganese sulphate, manganese chloride, copper sulphate, copper chloride, aluminium sulphate, aluminium chloride, poly- variations thereof, and combinations thereof. The inorganic metal salt of the composition of the present invention is selected on the basis that it can act as a coagulant and can interact with charged water-soluble impurities in such a manner so as to neutralise the charge of said water-soluble impurity to form a water-insoluble impurity, usually to form a water-insoluble salt of said impurity, which precipitates out of solution. The inorganic salt of the composition of the invention can also lower the turbidity of the water by increasing the particle size of the water-insoluble impurities possibly causing sedimentation or facilitating the removal of these water-insoluble impurities by filtration or other water-insoluble matter removal techniques such as flotation or decanting. The inorganic salts selected herein, can also co-precipitate heavy metal ions out of water, and can also lower the total organic content present in the water by coagulating or adsorption of this organic content onto the water-insoluble impurities which have been formed in the water.

Preferably the inorganic metal salt of the composition of the invention is a multivalent, preferably a di- or tri-valent, inorganic metal salt such as, aluminium III sulphate, iron II (ferrous) sulphate or iron III (ferric) sulphate. A most preferred inorganic metal salt for use herein is iron III sulphate. The term "inorganic metal salt" includes all poly-variations thereof such as polyaluminum chloride and polyferric material, but does not include compounds comprising methyl or ethyl groups. The inorganic metal salt is preferably free of carbon atoms. The term "inorganic metal salts which are free of carbon atoms" includes sources of inorganic metal salts winch comprise minor amounts of carbon impurity such as often found in naturally occurring inorganic metal salt sources. For example, preferred inorganic metal salts of the composition of the invention comprise (by weight of said salt) less than 5%, more preferably less than 3%, more preferably less than 1%, even more preferably less than 0.1%, even more preferably less than 0.01% carbon atoms.

Particularly preferred are those inorganic metal salts which are a source of acid, such as aluminium III sulphate or iron sulphate. This is especially true when the composition herein also comprises a source of carbonate such as sodium carbonate, since the acid source, and carbonate source, may react together to form a gas. This process is known as effervescence and helps to disperse the composition herein, especially when the composition herein is in the form of a tablet.

The composition herein preferably comprises (by weight) from 1%, or preferably from 5%, or preferably from 10%, or preferably from 15%, or preferably from 20%, or preferably from 25%, and preferably to 50%, or preferably to 40%, or preferably to 30% inorganic salt selected from the group consisting of iron sulphate, iron chloride, manganese sulphate, manganese chloride, copper sulphate, copper chloride, aluminium sulphate, aluminium chloride, poly-variations thereof, and combinations thereof.

Coagulant Aid

The water purification composition herein preferably comprises a coagulant aid (sometimes referred to herein as 'first polymeric material'). Highly preferred are polymeric materials which comprises an amine group and which are therefore cationic in nature. The first polymeric material is selected on the basis that it can aid the coagulation and flocculation process and in particular can in conjunction with the primary coagulant aid particle adherence and the aggregation of water-insoluble particles into larger water-insoluble aggregated complexes known as flocs. The first polymeric material may also adsorb or coagulate oils, fats and other organic or inorganic matter, and may sequester heavy metal ions.

The term "amine group" is defined herein as including primary amine groups, secondary amine groups, tertiary amine groups, quaternary amine groups such as quaternary ammonium groups, but the term "amine group" does not include amide groups. Said amine group can be the group linking the monomeric units of the backbone of the polymeric material, or may be present as a side group of the polymeric material, for example as an amine side group of a polysaccharide. Preferably the amine group is present as a side group.

Preferably, the polymeric material is substantially water-insoluble. "Substantially water-insoluble" is defined herein as having at least 10% by dry total weight of undissolved material present as determined by the following method:

1 g material is added to 1 litre of distilled water at a pH of between 6.0 and 8.0, at 20° C. and stirred vigorously for 24 hours. The water is then filtered through a 3 micrometer filter, and the undissolved material which is collected by the filter step is dried at 80° C. until constant weight, typically for 24 to 48 hours. The weight of this undissolved material is then determined and the % dry weight of this undissolved material can be calculated.

The amine group of the first polymeric material is preferably at least partly protonated when the first polymeric material comes into contact with water, typically this protonation reaction occurs at a pH of below 9.0, and preferably at a pH of from 3 to 8. Thus, preferably the first polymeric material is cationic when in a solution of water at a pH of below 9. Alternatively, the amine group of the first polymeric material may already be in a charged state, for example a substituted or protonated state. The amine group of the first polymeric material may be a cationic quaternary ammonium group.

The first polymeric material preferably comprises a polysaccharide comprising an amine group. The first polymeric material may comprise a cationic starch, for example, cationic starch obtained from potato starch, waxy maize starch, corn starch, wheat starch and rice starch. More preferably, the first polymeric material comprises a polysaccharide which comprises an amine group which is bound directly to the monomer saccharide backbone unit of said polysaccharide. More preferably the first polymeric material comprises a polymer of glucosamine where all the monomer saccharide backbone units are connected in a linear conformation via beta-1–4-glycosidic bonds. More preferably, the first polymeric material comprises a modified chitin, such as chitosan, modified chitosan, or salts thereof. Most preferably the first polymeric material comprises chitosan or modified chitosan. The first polymeric material may be an impurity of chitin, and therefore, chitin may be a preferred source of first polymeric material for use herein.

Chitosan suitable for use herein is typically derived from the chitin of crustacea such as crabs, lobsters and shrimps. Chitosan derived from the chitin of fungi can also be used herein. The chitosan for use herein is typically found in the shells of crustacea and can be extracted by any technique known in the art, for example by using the extraction techniques described in U.S. Pat. Nos. 3,533,940, 3,862,122, 3,922,260 and 4,195,175.

The first polymeric material for use herein typically has an amine modification degree of at least 0.1, more preferably at least 0.2, or preferably at least 0.3, or preferably at least 0.4, or preferably at least 0.5, or preferably at least 0.6, or preferably at least 0.7, or preferably at least 0.8, or preferably at least 0.9, or preferably at least 1.0. Said modification degree is an indication of the amount of amine groups present in the polymeric material and is defined as the number ratio of the number of amine groups present in the polymeric material per monomer unit of the polymeric material.

Preferably, the first polymeric material has a weight average molecular weight of at least 10000, or preferably at least 25000, or preferably at least 50000, or preferably at least 75000, or preferably at least 100000.

The composition herein preferably comprises (by weight) from 0.1%, or preferably from 0.5%, or preferably from 1%, or preferably from 1.5%, or preferably from 2%, or preferably from 2.5%, and preferably to 50%, or preferably to 40%, or preferably to 30%, or preferably to 20%, or preferably to 10%, or preferably to 5%, or preferably to 4% first polymeric material.

Bridging Flocculant

The composition also herein comprises a bridging flocculant (sometimes referred to herein as the second polymeric material). Preferably the second polymeric material is substantially water-soluble at in-use concentrations and has a weight average molecular weight of at least about 100,000, preferably at least about 2000000. The second polymeric material is selected on the basis that it can act as flocculent and cause the aggregation of water-insoluble particles into larger water-insoluble aggregated complexes known as flocs. It is believed that the ability of the second polymeric material to act as a flocculent, is due to the combination of its high molecular weight, structure, and water-solubility properties.

The second polymeric material is usually of greater molecular weight than the first polymeric material and preferably does not comprise an amine group. Preferably the second polymeric material comprises an amide group. More preferably the second polymeric material is a polyacrylamide. The second polymeric material is preferably not a cationic polyacrylanide, and preferably, the second polymeric material is not cationic.

Preferably, the second polymeric material for use herein is nonionic or anionic, preferably anionic, more preferably the second polymeric material contains at least 0.02, or preferably at least 0.05, or preferably at least 0.1 anionic groups per monomer unit.

The second polymeric material for use herein is typically a polyacrylamide, especially preferred are anionic or nonionic polyacrylamides. Typical anionic and nonionic polyacrylamides for use herein are those from the Magnafloc range supplied by Ciba. Of these polyacrylamides, especially preferred are those known under the trade name as Magnafloc LT20, Magnafloc LT25, Magnafloc LT25S, Magnafloc LT26, Magnafloc LT28, Magnafloc 351 and Magnafloc 919.

It is preferred that a low amount of substantially water-soluble organic content is present in the composition herein. The term "low amount of substantially water-soluble content" can be determined by the following method:

500 mg of said composition is added to 1 litre of deionised water which comprises no detectable amounts of substantially water-soluble organic content, to form a solution. Said solution is left with occasional stirring for 30 minutes and is then filtered through Whatman GF/C paper having an average pore size of 1.2 micrometers to obtain purified water. The level of total organic content (TOC) of said purified water is determined using the ISO method 8245:1999. A composition comprising "a substantially low amount of water-soluble content" is defined as a composition which gives a TOC of said purified water of less than 10 ppm, preferably less than 7 ppm, more preferably less than 4 ppm when determined using this method.

It is also preferred that a low amount of substantially water-soluble organic content is obtained on use of the composition either in-vivo or on model surface water. For this purpose, 620 mg of the composition is added to 1 litre of in-vivo or model surface water respectively and the test repeated. Preferably, the TOC of the water after treatment is less than 10 ppm, more preferably less than 7 ppm, and especially less than 4 ppm.

Preferably, the second polymeric material does not comprise a polysaccharide and more preferably the second polymeric material does not comprise a carboxymethyl cellulose or derivative thereof.

Preferably, the weight average molecular weight of the second polymeric material is at least 2500000, or preferably at least 3000000, or preferably at least 5000000, or preferably at least 7500000, or preferably at least 10000000, or preferably at least 15000000.

Preferably, the composition herein comprises (by weight) from 0.1%, or preferably from 0.2%, or preferably from 0.5%, or preferably from 1%, and preferably to 30%, or preferably to 20%, or preferably to 10%, or preferably to 5%, or preferably to 3% second polymeric material.

Microbiocidal Disinfectant

The composition herein preferably comprises a microbiocidal disinfectant (sometimes referred to herein as the disinfecting agent). The disinfecting agent may comprise any compound which disinfects or sanitises water. The disinfecting agent may be inorganic such as silver salts, colloidal silver, nanosilver, ozone, chlorine dioxide, chlorine, sodium hypochlorite or chloramine. The disinfecting agent may also be organic such as a quaternary ammonium compound. Preferred disinfecting agents include inorganic chlorine based disinfectants, wherein the chlorine is in a formal oxidation state that is not minus one, preferably above minus one. Preferred sources of chlorine comprise hypochlorites (especially calcium hypochlorite) and organic sources of chlorine such as isocyanurates. Other preferred disinfecting agents comprise iodine and sources of iodine such as polyiodide resins.

As previously discussed, the disinfecting agent is preferably used in a controlled, delayed, sustained or slow release form. Means for providing such controlled, delayed, sustained or slow release (hereafter 'means for providing delayed release') can include blending or coating the disinfecting agent with, for example, a poorly water-soluble or hydrophobic material, or providing a coating of sufficient thickness that the kinetics of dissolution of the coating provide delayed release. Poorly water-soluble or hydrophobic materials include waxes, paraffins, silicas, zeolites, clays, polymeric resins, celluloses, cross-linked polymers, insoluble salts such as calcium carbonate, etc. The coating material can be applied by agglomeration in, for example, pan, rotary drum and vertical blenders, or by spray atomization. Other means for providing delayed release include mechanical means for altering the physical properties of the disinfecting agent, for example, compaction, granulation means for altering the particle size distribution of the disinfecting agent, etc.

Highly preferred herein from the viewpoint of achieving optimum flocculation and disinfectancy performance in water contaminated with high levels of organic impurities is a particulate disinfecting agent, preferably calcium hypochlorite, having a particle size distribution such that at least about 50%, preferably at least about 75%, more preferably at least about 90% by weight is retained on a 210 $\mu$m (Tyler 65 mesh) screen, preferably on a 425 $\mu$m (35 mesh) screen, more preferably on a 600 $\mu$m (28 mesh) screen, yet more preferably on a 710 $\mu$m (24 mesh) screen, even more preferably on a 850 $\mu$m (20 mesh) screen, and especially on a 1000 $\mu$m (16 mesh) screen.

In order to minimise random sampling variance in the final unit dose composition, it is also preferred that the particulate disinfecting agent has a particle size distribution such that at least about 50%, preferably at least about 75% by weight thereof passes through a 2000 $\mu$m (9 mesh) screen and more preferably through a 1400 $\mu$m (12 mesh) screen.

The composition herein preferably comprises (by weight) from 0.01%, or preferably from 0.1%, or preferably from 0.2%, or preferably from 0.5%, or preferably from 0.7%, or preferably from 1.0%, or preferably from 1.2%, or preferably from 1.5%, and preferably to 20%, or preferably to 10%, or preferably to 5%, or preferably to 4%, or preferably to 2.5% disinfecting agent.

Water-Insoluble Silicate

The composition herein preferably comprises a water-insoluble silicate selected from clays, zeolites and mixtures thereof.

Highly preferred silicates for use herein are clays. The clay acts as a seed particle onto which water-insoluble impurities can aggregate to form flocs. The presence of clay in the composition improves the rate of floc formation and allows the formation of larger flocs compared to when clay is absent from the composition herein. The clay may also act as a swelling agent, and if the composition herein is in the form of a tablet, the clay improves the rate at which the tablet disintegrates on contact with water by swelling upon contact with water so that the components of the tablet are pushed apart by the swollen clay particles. The clay can also act as a desiccant within the tablet. The clay may also act as a cationic exchange agent to remove metal ions from the water and the clay can also remove colour, heavy metals and some organic material from water by adsorption.

The clay is preferably a smectite clay, preferably a dioctahedral smectite clay such as montmorillonite clay or a trioctahedral smectite clay such as hectorite clay. Those clays found in bentonite clay deposits are also preferred. Particularly preferred clays for use herein include laponite clay, hectorite, montmorillonite, nontronite, saponite, volkonsite, sauconite, beidellite, allevarlite, illite, halloysite and attapulgite. In compositions containing calcium hypochlorite, the free moisture content of the clay should be carefully controlled to provide acceptable disinfectant stability. Preferably the free moisture content should be less than about 4%, more preferably less than about 3%, especially less than about 2.5% and more especially less than about 1.5% by weight. Free moisture content is determined on a 2 g sample of the test material following the procedure as described hereinabove.

Highly preferred for use herein from the viewpoint of providing optimum disinfectant stability are pre-dried clays which in their dessicated form have the potential to scavenge or pick up moisture. Such clays can be described in terms of their so-called 'water-capacity', defined herein as the equilibrium weight percentage of moisture picked up by a small sample (e.g. 10 mg) of the dessicated material from air at 80% relative humidity and 20° C. as measured by dynamic vapour sorption techniques. For example, if 10 mg of the dessicated clay picks up 2 mg moisture, the dessicated clay has a water capacity of 20%. Preferred for use herein are dessicated clays having a water capacity of at least about 10%, preferably at least about 15%, and more preferably at least about 18%.

The composition herein preferably comprises (by weight) from 1%, or preferably from 5%, or preferably from 10%, or preferably from 15%, or preferably from 20%, or preferably from 25%, and preferably to 80%, or preferably to 50%, or preferably to 35% clay.

Aluminosilicates may be used herein in place of, or in addition to, clay. The aluminosilicate can act as a cationic exchange agent to remove metal ions from water, and can also act as a seed particle to enhance floc formation and as dessicant for enhancing disinfectant stability. Preferred aluminosilicates for use herein include zeolite A, zeolite X, zeolite Y, zeolite P and zeolite beta. Preferably the free moisture content of the aluminosilcate should be less than about 4%, more preferably less than about 3%, especially less than about 2.5% and more especially less than about 1.5% by weight.

Highly preferred for use herein from the viewpoint of providing optimum disinfectant stability are pre-dried aluminosilicates which in their dessicated form have the potential to scavenge or pick up moisture. Such dessicated aluminosilicates can also be described in terms of their so-called 'water-capacity', as defined hereinabove. Preferred for use herein are dessicated aluminosilicates having a water capacity of at least about 10%, preferably at least about 15%, and more preferably at least about 18%.

The composition herein preferably comprises (by weight) from 1%, or preferably from 5%, or preferably from 10%, or preferably from 15%, or preferably from 20%, or preferably from 25%, and preferably to 80%, or preferably to 50%, or preferably to 35% aluminosilicate.

A Third Polymeric Material

The composition herein may comprise a third polymeric material. Said third polymeric material does not contain an amine group and is substantially water insoluble. The term "substantially water insoluble" is defined hereinbefore. Thus, the third polymeric material is different to, and is not, the first polymeric material or the second polymeric material. The third polymeric material is selected on the basis that it can act as a seed particle to enhance floc formation. The third polymeric material can be used in place of, or in addition to, clay or zeolite. Preferably the free moisture content of the third polymeric material should be less than about 4%, more preferably less than about 3%, especially less than about 2.5% and more especially less than about 1.5% by weight.

Preferably the third polymeric material comprises cellulose, more preferably the third polymeric material is an unmodified cellulose. Most preferably the third polymeric material comprises powdered cellulose.

The composition herein preferably comprises (by weight) from 1%, or preferably from 5%, or preferably from 10%, or preferably from 15%, or preferably from 20%, or preferably from 25%, and preferably to 80%, or preferably to 50%, or preferably to 35% third polymeric material.

Alkali Agent

The composition herein may comprise an alkali agent. The alkali agent can be any compound which gives alkalinity when contacted to water. The alkali agent for use herein is not a polymeric material. The composition herein preferably comprises an amount of alkali agent such that when the composition herein is contacted to water to form a solution, said solution has a pH of from 5 to 8, preferably from 6 to 7.

Preferred alkali agents are selected from the group consisting of sodium carbonate, sodium bicarbonate, sodium hydroxide, sodium oxide, calcium carbonate, calcium bicarbonate, calcium hydroxide, calcium oxide, potassium carbonate, potassium bicarbonate, potassium hydroxide, potassium oxide and combinations thereof.

Particular alkali agents which are a source of carbonate when contacted to water, for example sodium carbonate or sodium bicarbonate may be preferred for used herein. If the composition herein comprises a source of acid, for example an inorganic salt of the composition of the present invention such as iron sulphate, said alkali agent which is a source of carbonate can interact with said acid source in the presence of water to produce a gas. This process is known as effervescence, and improves the rate at which the composition disperses, especially when the composition herein is in the form of a tablet.

Highly preferred herein, especially in compositions containing calcium hypochorite as disinfecting agent, are alkalis which can also act as moisture sinks, especially anhydrous sodium carbonate.

The composition herein typically comprises (by weight) from 1% to 50%, preferably from 10%, or preferably from 15%, or preferably from 20%, or preferably from 25%, and preferably to 45%, or preferably to 40%, or preferably to 35% alkali agent.

Composition

The composition herein is preferably in a solid unit dose form, most preferably in a tablet or powder form. The composition herein is preferably packaged so that it is protected from environmental conditions such as moisture. Preferably the composition herein is packaged in a water impermeable material such as polypropylene or typical laminates. An example of one such laminate is a laminate supplied by Akerlund & Raus, comprising layers of coated paper (outer), LDPE, aluminium foil and an inner layer Surlyn (an ethylene/methacrylate co-polymer)—an FDA approved food packaging.

Method for Use

The composition herein can be used to purify water using a method comprising the steps of (a) contacting the composition herein to water to obtain partially purified water comprising solid matter; and (b) removing at least part of said solid matter from said partially purified water by; (i) filtration; or (ii) decanting; or (iii) sedimentation; or (iv) flotation; or (v) a combination thereof, to obtain purified water.

The composition herein can be in the form of a tablet or solid powder which is added to water, typically to form partially purified water comprising solid matter such as floes. This solid matter can be removed or separated from the remaining part of the partially purified water by any technique, typically by filtration but decanting, sedimentation and flotation may also be used. By filtration it is meant passing the partially purified water through a filter. Filtration can occur by pouring means, for example by pouring said partially purified water through a filter to remove at least part of the solid matter from said partially purified water. Filtration can also occur by centripetal force means, for example by total enclosing the partially purified water by a filter and spinning said partially purified water and said filter so that said partially purified water passes through said filter and at least part of said solid matter is separated from said partially purified water. Filtration can also occur by plunging means, for example by plunging or moving a filter through said partially purified water so that at least part of said solid matter is separated from said partially purified water.

Filters typically used include cloth filters, non-woven and paper filters and polishing filters, such as filters comprising activated carbon, glass fibre, zeolite, ion exchange media, or a combination thereof, which remove residual water-impurities, e.g. organic matter, heavy metal ions and residual disinfectant from the water. Filters suitable for use may be impregnated with silver or other biostatic components so that bacteria cannot grow on said filter and the filter can be reused several times without contaminating the water being filtered. Sand filters can also be used, and more than one filter may be used in combination herein.

Preferably, from 10 mg, or preferably from 50 mg, or preferably from 75 mg, or preferably from 100 mg, or preferably from 150 mg, or preferably from 200 mg, or preferably from 250 mg, or preferably from 300 mg, and preferably to 2000 mg, or preferably to 1000 mg, or preferably to 750 mg of composition herein is added to 1 litre of water. The amount of composition herein which is added to the water depends on the impurity of said water. For example, less composition is needed to adequately purify water which is not very impure compared to the amount of composition herein which is needed to purify very impure water.

EXAMPLES

Example 1

The following compositions are in accord with the present invention. All percentages are by weight of composition.

| Ingredient | A | B | C | D | E | F | G | H | I | J | K |
|---|---|---|---|---|---|---|---|---|---|---|---|
| Chitosan | 3.5 | 4 | | 1.5 | 3 | 15 | 1 | 2 | | 3 | 1.5 |
| Cationic modified potato starch | | | 3 | | | | | | 1 | | |
| Magnafloc LT20 | | | | 2 | 5 | 10 | | 1 | | | |
| Magnafloc LT25 | 1.5 | 2 | | 1 | | | | 3 | | 3 | |
| Magnafloc LT28 | | | 3 | | | | 1 | | 5 | | 1.5 |
| Aluminium sulphate | | 32 | | 15 | 10 | 30 | 45 | 25 | 10 | | 35 |
| Iron III sulphate | 30 | | 22 | | | | | | | 25 | |
| Calcium hypochlorite | | 2 | | | 0.5 | | | 1 | | | |
| Iodine | | | | 1 | | | | | | | |
| Hectorite clay | | | 40 | | | 15 | | 20 | | 40 | 25 |
| Montmorillonite clay | 30 | 32 | | 55 | | | 5 | | 70 | | |
| Zeolite X | | | 12 | | 70 | | | 20 | | | |
| Sodium carbonate | 30 | 25 | 15 | | 10 | 30 | | | 10 | 25 | |
| Sodium bicarbonate | | | | 22 | | | 45 | 25 | | | 35 |
| Miscellaneous | to 100 | to 100 | to 100 | to 100 | to 100 | to 100 | to 100 | to 100 | to 100 | to 100 | to 100 |

Example 2

500 mg of the compositions A to K from example 1 were added in powder or tablet from to 1 litre of water, respectively. The water was then agitated or stirred briefly. The water was left to stand for 5 minutes, after which said water was stirred or agitated for a further minute and then left to stand for another 20 minutes. During this time, water-insoluble floes formed in the water. The was then poured through a tightly woven cloth filter to remove said water-insoluble floes, and the remaining part of the water was collected. This remaining part of the water is purified water.

Example 3

500 mg of the compositions A, C, D, F, G, I, J and K were added in powder or tablet from to 1 litre of water, respectively. The water was then agitated or stirred briefly. The water was left to stand for 10 minutes, after which said water was stirred or agitated for a further minute and then left to stand for another 20 minutes. During this time, water-insoluble flocs formed in the water. The was then poured through a tightly woven cloth filter to remove said water-insoluble floes, and the remaining part of the water was collected. 1 mg calcium hypochlorite was then added to the collected water, and the collected water was agitated or stirred briefly. This collected water is purified water.

Example 4

The following are further compositions according to the invention. All percentages are by weight of composition.

| Ingredient | L | M | N | O | P | Q | R | S | T | U | V |
|---|---|---|---|---|---|---|---|---|---|---|---|
| Chitosan | 1.7 | 2 | | 1.5 | 1.3 | 3 | 1 | 2 | | 1.8 | 1.5 |
| Cationic modified potato starch | | | 1.5 | | | | | | 1 | | |
| Magnafloc LT20 | | | | | 0.2 | 0.5 | 1.1 | 0.3 | | | |
| Magnafloc LT25 | 1.5 | 0.8 | | | 1 | | | 0.3 | | 0.9 | |
| Magnafloc LT28 | | | 1.3 | | | | 1 | | 1.5 | | 1.5 |
| Aluminium sulphate | | 34 | | 33 | | 35 | | 29 | | | 36 |
| Iron III sulphate | 33 | | 25 | | 30 | | 37 | | 29 | 30 | |
| Calcium hypochlorite | 0.8 | 1 | 1.5 | 1 | 0.5 | 0.8 | 1.2 | 1 | 1.5 | 0.9 | 1.1 |
| Hectorite clay | | | 35 | | | 28 | | 20 | | 40 | 26 |
| Montmorillonite clay | 32 | 34 | | 35 | | | 27 | | 45 | | |
| Zeolite X | | | 12 | | 40 | | | 20 | | | |
| Sodium carbonate | 31 | 27 | 23 | 26 | 27 | 31 | 32 | 25 | 22 | 25 | 33 |

-continued

| Ingredient | Composition | | | | | | | | | | |
|---|---|---|---|---|---|---|---|---|---|---|---|
| | L | M | N | O | P | Q | R | S | T | U | V |
| Sodium fluoride | | 0.9 | | 1.5 | | 0.4 | | 2.2 | | 1 | |
| Miscellaneous | to 100 | to 100 | to 100 | to 100 | to 100 | to 100 | to 100 | to 100 | to 100 | to 100 | to 100 |

In the above, the calcium hypochlorite was added in granular form comprising particles of about 1212 μm median particle size with less than 25% by weight larger than 1400 μm, less than 0.5% by weight larger than 2000 μm and less than 3% by weight smaller than 150 μm. The free moisture content of the compositions was in the range from 1% to 4%. The hectorite clay, montmorillonite clay and zeolite X were all predried to a free moisture content below 1.5% by weight and had a water capacity in excess of 18%. The compositions have a $t_{max}$ of at least about 8 minutes and a $t_{80}$ of less than about 30 seconds. 6.2 g of compositions L to V were added in powder form from unit dose polypropylene sachets to 10 litres of water. The water was then agitated or stirred briefly. The water was left to stand for 5 minutes, after which said water was stirred or agitated for a further minute, left to stand for a further five minutes, after which said water was stirred or agitated for a further minute and then left to stand for another 5 minutes. During this time, water-insoluble flocs formed in the water. The liquid was then filtered through a cotton cloth or non-woven filter to remove said water-insoluble flocs, and the filtrate was collected. The filtrate was left for a further 15 minutes and is purified water.

What is claimed is:

1. A composition for purifying and clarifying contaminated drinking water, said composition comprising:
    (i) a primary coagulant selected from the group consisting of water-soluble, multivalent inorganic salts and mixtures thereof;
    (ii) a bridging flocculant selected from the group consisting of water-soluble and water-dispersible anionic and nonionic polymers having a weight average molecular weight of at least about 2,000,000, and mixtures thereof;
    (iii) a coagulant aid selected from the group consisting of water-soluble and water-dispersible cationic polymers having a weight average molecular weight of less than about 1,500,000, and mixtures thereof; and optionally one or more of
    (iv) a microbiocidal disinfectant;
    (v) a water-soluble alkali;
    (vi) a water-insoluble silicate selected from the group consisting of clays, zeolites and mixtures thereof;
    (vii) a food additive or nutrient source; and
wherein the weight ratio of said primary coagulant to said bridging flocculant is from about 10:1 to about 100:1.

2. A composition according to claim 1, wherein the weight ratio of said primary coagulant to said coagulant aid is from about 8:1 to about 100:1.

3. A composition according to claim 1, wherein the weight ratio of said coagulant aid to said bridging flocculant is in the range from about 10:1 to about 1:6.

4. A composition according to claim 1, wherein the weight ratio of said primary coagulant to said water-soluble alkali is from about 0.8:1 to about 3:1.

5. A composition according to claim 1, wherein the weight ratio of said primary coagulant to said water-insoluble silicate is from about 0.3:1 to about 5:1.

6. A composition according to said primary coagulant is from about 10% to about 99%, by weight.

7. A composition according to claim 1, wherein said bridging flocculent is from about 0.1% to about 10%, by weight.

8. A composition according to claim 1, wherein said coagulant aid is from about 0.1% to about 10%, by weight.

9. A composition according to claim 1, wherein said microbiocidal disinfectant is from about 0.2% to about 10%, by weight.

10. A composition according to claim 1, wherein said water-soluble alkali is from about 10% to about 45%, by weight.

11. A composition according to claim 1, wherein said water-insoluble silicate is from about 10% to about 80%, by weight.

12. A composition according to claim 1, wherein said composition is in unit dosage form for the batchwise purification and clarification of a relatively small predetermined volume of contaminated drinking water.

13. A composition according to claim 1, wherein said composition is in unit dosage form for treating a volume of contaminated drinking water in the range from about 0.1 to about 100 litres, and wherein the unit dosage amount of the composition is in the range from about 50 to about 2000, mg/litre of contaminated drinking water.

14. A composition according to claim 1, wherein said composition is in unit dosage form comprising:
    (i) from about 15% to about 50%, by weight of said primary coagulum
    (ii) from about 0.5% to about 5%, by weight of said bridging flocculent; and
    (iii) from about 0.5% to about 5%, by weight of said coagulant aid.

15. A composition according to claim 1, further comprising said primary coagulant, bridging flocculant and coagulant aid in amounts sufficient to provide by weight of the contaminated drinking water from about 50 to about 500 ppm of said primary coagulant, from about 1 to about 15 ppm of said bridging flocculant, and from about 1 to about 25ppm of said coagulant aid.

16. A composition according to claim 1, wherein said microbiocidal disinfectant is in controlled, delayed, sustained or slow release farm wherein said composition has a $t_{max}$ corresponding to the time for achieving maximum disinfectant concentration after addition to deionized water at 20° C. of at least 1 minute.

17. A composition according to claim 1, wherein said composition has an 80%-ile soluble organic matter flocculation rate ($t_{80}$) as heroin defined of less than 2 minutes.

18. A composition according to claim 1, wherein said coagulant aid is a substantially water-insoluble cationic polysaccharide.

19. A composition according to claim 1, wherein said microbiocidal disinfectant is a chlorine-based disinfectant.

* * * * *